April 6, 1971     D. KASS     3,574,017
ORNAMENTAL SYSTEM
Filed April 9, 1969     2 Sheets-Sheet 1
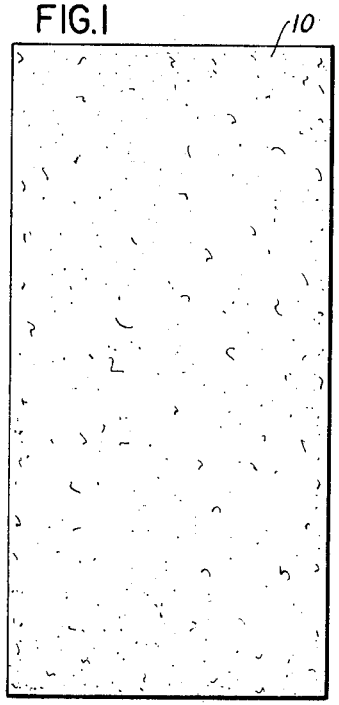
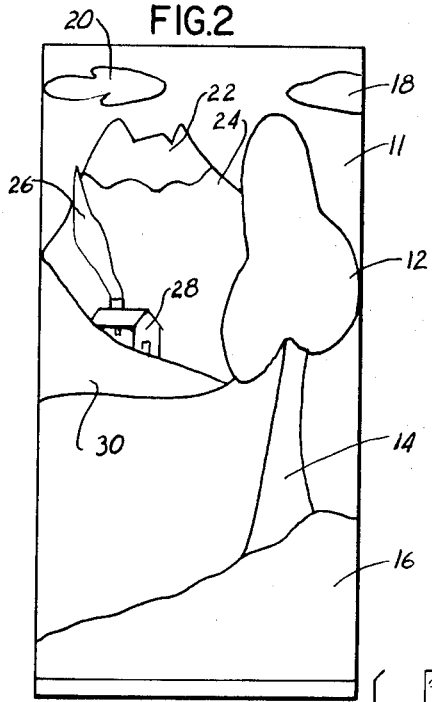
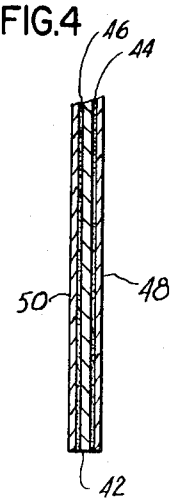
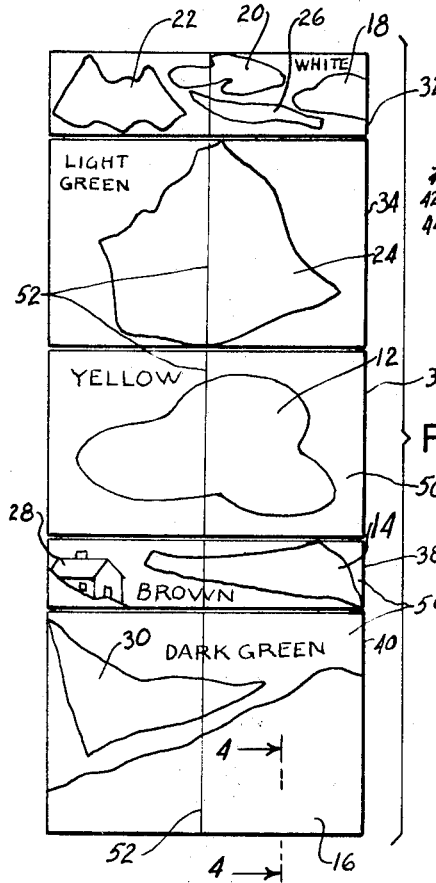
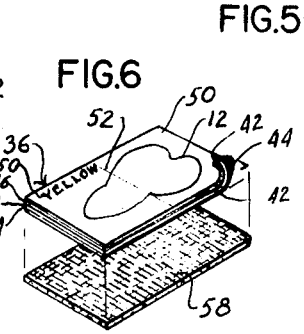
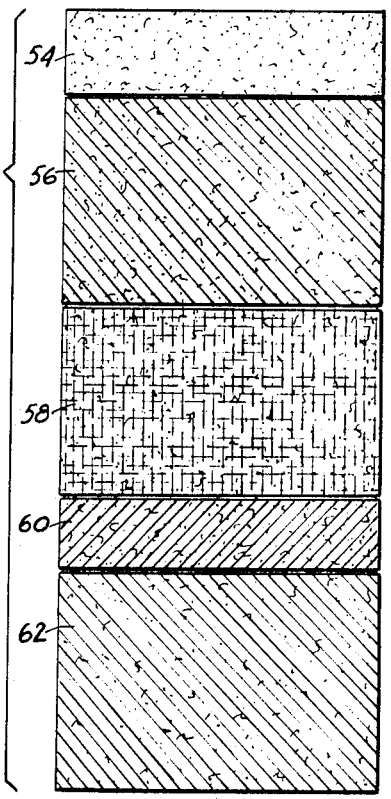
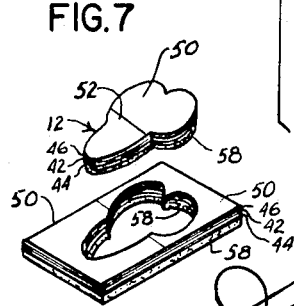
INVENTOR.
DAVID KASS
BY James Franklin
ATTORNEYS April 6, 1971  D. KASS  3,574,017
ORNAMENTAL SYSTEM
Filed April 9, 1969  2 Sheets-Sheet 2
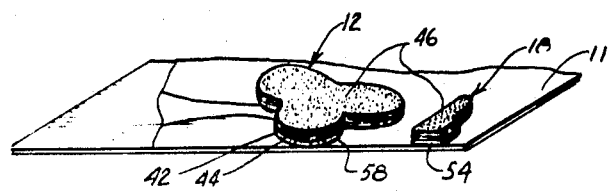
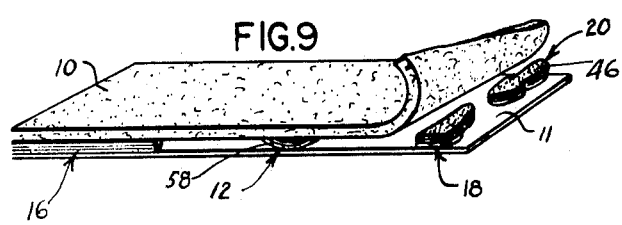
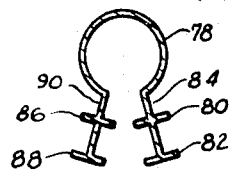
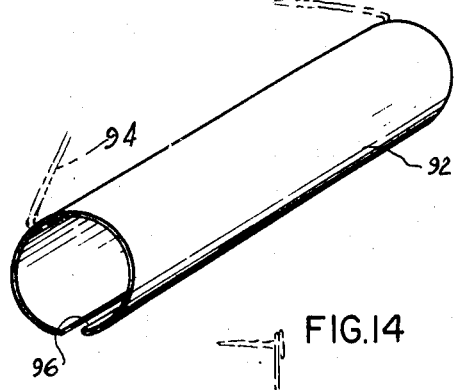
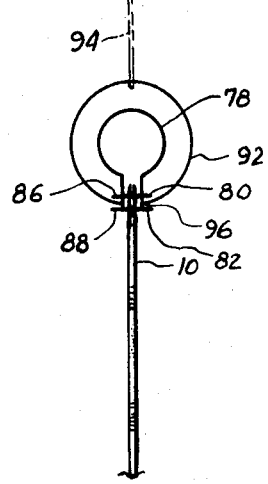
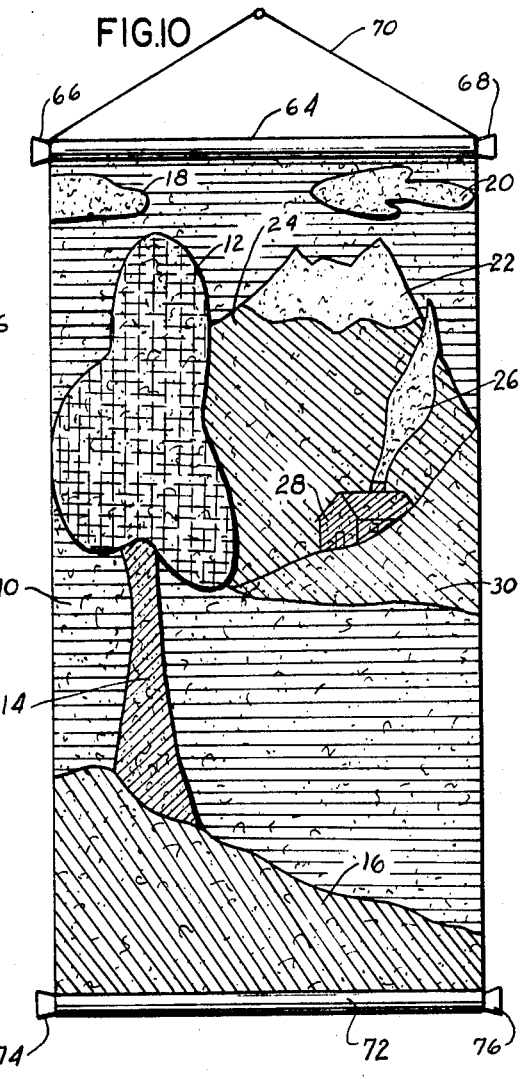
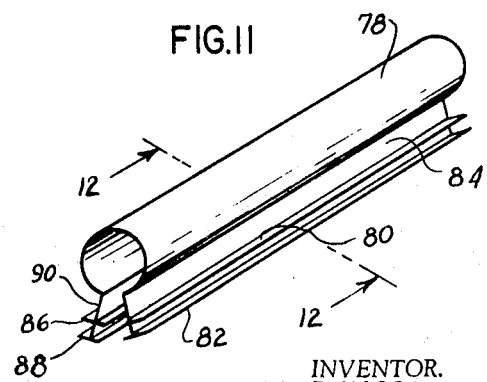
INVENTOR.
DAVID KASS
BY
James & Franklin
ATTORNEYS

United States Patent Office 3,574,017
Patented Apr. 6, 1971

3,574,017
ORNAMENTAL SYSTEM
David Kass, 5 Schenk Ave., Great Neck, N.Y. 11020
Filed Apr. 9, 1969, Ser. No. 814,713
Int. Cl. B44c; B32b 3/16
U.S. Cl. 156—63                           17 Claims

ABSTRACT OF THE DISCLOSURE

An ornamental system including a plurality of components which are formed into a pictorial design or pictorial composition, preferably for use as a wall hanging assembly, is provided. The system includes four main components which are joined in a prescribed manner during the formation of the pictorial composition. The components may be provided with indicia of one kind or another for a proper matching thereof to assist in the assembly operation. One such indicia is the use of outline shapes of the individual objects which form a part of the final pictorial composition. The outline shapes are printed on an object forming guide member to assist in the accurate formation of an object. After formation, the several objects are placed on a guide sheet which is used to precisely position the variously shaped objects. A background unit is also included, and it is upon this unit that the properly positioned objects are transferred from the guide sheet to form the completed pictorial composition.

---

This invention relates to ornamental systems, and more particularly to a decorative ornament which may be used as a wall hanging assembly.

The art of preparing decorative products for ornamentation has been in practice in one form or another for many centuries. Some forms of such decorative products are as old as civilization itself and include woven tapestry, stitched rugs, and of course paintings and other pictorial compositions of every kind. These forms of ornamentation invariably require specific skills and involve a long period of time to complete.

There has recently been developed a number of simplified assembly systems which are designed to shorten the time required to produce a decorative pictorial assembly. However, as a result of emphasizing the time factor, much of the skill which was formerly required is no longer needed and therefore the pleasurable sense of accomplishment normally experienced upon a completion of the product is lacking. Certain systems require no more effort than a mechanical gluing of one part upon another, and thus are generally a burdensome chore rather than a pleasant exercise. In addition, the resultant product in these systems often lacks the professional appearance which is desired. Despite these disadvantages, simplified assembly systems for producing decorative products continue to have a strong commercial appeal. Other disadvantages, however, seriously detract even from the commercial value of such systems. For example, the individual who constructs the final product from the assembly components usually requires the assistance of certain materials or tools, most notable being an adhesive such as glue. Needless to say, the use of such a tool often causes waste and unsightly completed products. Furthermore, the use of glue or the like generally requires that the individual components be properly positioned after applying the glue and any misplacement will be very evident in the final product.

A further difficulty which is often encountered in systems of this type is the inability to produce a three-dimensional final product. Part of the difficulty is due to the unavailability of a component material which is flexible enough to be cut into the proper object size, and yet rigid enough to hold its shape after it is positioned in the assembly.

Still another problem which currently faces the manufacturer of such assembly systems is the fact that printing on certain background materials is an extremely expensive if not impossible task. As a result, when "by the numbers" type systems are manufactured, the particular component which includes numbering or outlined sections is usually composed of paper. Obviously, the overall decorative effect which can be achieved by the use of paper is severely limited.

It is the primary object of this invention therefore to provide an ornamental system which is easily assembled to produce a pictorial design or composition having a professional appearance and providing an attractive decor for any environment. It is another object of this invention to provide a background unit of virtually any material, since the need for printing on such background material is eliminated. It is still another object of this invention to provide an ornamental system which includes components having the necessary flexibility to be manipulated during assembly and the necessary rigidity to provide a three-dimensional effect without distortion in the final product. Yet another object of this invention is to provide an ornamental system which can be readily assembled without the need of an external source of glue or adhesive material. A further object of this invention is to include auxiliary equipment in the ornamental system which enables the assembled product to be easily positioned on a wall.

The aforementioned objects are realized by the ornamental system of the invention which comprises four basic components. The first of these components is a background unit which may be composed of virtually any material, either rigid or flexible. For this component, felt is the preferred material because it provides an excellent visual effect in the final assembly and is easy to work with during the assembly process. The background unit may have any coloration which suitably blends with the overall appearance of the pictorial composition which is formed. It is upon the background unit that the various objects which are a part of the pictorial composition are placed.

The second component is a guide sheet which is not a part of the final composition, but which is used to assist in the assembly of the pictorial composition. The guide sheet is preferably composed of paper since a number of object outlines are printed thereon. The outlines are positioned on the guide sheet to form a mirror image of the pictorial composition which is to be produced. The guide sheet, as its name implies, is designed to act as a guide in positioning the various objects which are to be later transferred to the background unit.

The third and fourth components of the system are used to form the objects which are placed on the guide sheet and which are later transferred to the background unit. One of these components is called an object-forming guide member and the other component is termed an object section. There are a plurality of each of these components since a number of objects will be formed. The object-forming guide members essentially comprise a vehicle material such as paper or the like, having both of its opposite surfaces coated with an adhesive that instantly adheres to most material surfaces upon contact with them. Both of the adhesive coated surfaces of the vehicle material are covered with a release paper for protection. In the preferred embodiment of the invention, one of the adhesive surfaces on each guide member is covered with a release paper upon which is printed an object outline. Each such object outline corresponds to an object outline on the guide sheet, and is intended to aid the individual in the formation of the various objects. The object sections may be plain pieces of material having a coloration which is suitable for the object to be formed therefrom. In order to obtain the objects for placement in the final composition, the object sections are joined to the adhesive surface on the object-forming guide members opposite the release paper having the printed outline thereon. This is accomplished by removing the non-printed release paper from the object-forming guide members and bringing them into contact with the object sections. The various objects are then obtained by cutting along the outline on the release paper. Thus, a properly shaped object is formed and is composed of the object section, the vehicle material having the remaining unused adhesive surface, and the printed release paper which is still covering the unused adhesive surface.

To obtain the final assembled product the properly shaped objects which were cut from the object-forming guide members and the object sections are placed in contact with the guide sheet, the placement on the guide sheet being accurately assured by matching the shape of the object to the corresponding outline shape on the guide sheet. The exposed object section is in contact with the guide sheet and therefore all of the objects are releasably placed on the guide sheet. After the objects are positioned on the guide sheet, the release paper having the outline imprinted thereon is removed from each object and the background unit is brought in contact with the several objects on the guide sheet. Because the adhesive on each object is now expected, the objects will cling to the background unit without difficulty. Thus the background unit merely is rolled over the objects or positioned on all of the objects simultaneously and then the objects and the background unit are lifted off the guide sheet. Since the objects were positioned on the guide sheet in a reversed or mirror image position, the transferral to the background unit results in a proper orientation of the objects in the final composition.

The assembly of the final poduct can even be further simplified by inserting certain indicia on the guide sheet on each outline shape. Corresponding indicia could also be placed on the object-forming guide member, preferably on the release paper which has the outline printed thereon. Thus, when the placement of the several objects on to the guide sheet is desired, it is very simply accomplished by matching respective indicia. However, the elimination of such indicia from these components may provide an added attraction to the system since the placement of the various objects on the guide sheet may well become a challenge.

Another feature of the ornamental system of the invention is the inclusion of components which are designed to supplement the final product assembly to enable it to be placed on a wall. For this purpose means are included for securing the background unit to a rod or the like. Normally, such equipment is either affixed to the background unit prior to assembling the other parts and therefore causes the assembly operation to be unnecessarily cumbersome or it is affixed after the assembly operation has been completed, and in this case often is a difficult task. The present invention provides a rod assembly which overcomes these problems. The rod assembly comprises first and second tubes, both tubes being of a resilient material and each having a diameter such that one tube fits within the other. The edge of the background unit is positioned within the inner tube, and is secured therein by means of an interlocking effect between tubes. The tubes are readily disassembled, if desired, since no additional mechanical parts are needed to lock the background unit in place.

To the accomplishment of the above, and to such other objects as will hereinafter appear, the present invention relates to an ornamental system as defined in the appended claims, and as described in the specification, taken together with the accompanying drawings in which:

FIG. 1 is an illustration of a background unit typically employed in the system of the invention;

FIG. 2 is an illustration of a guide sheet with a plurality of outlined objects positioned to form a reverse image of a pictorial composition;

FIG. 3 is a front elevational view of a plurality of object-forming guide members which include the outline shapes of the various objects positioned on the guide sheet of FIG. 2;

FIG. 4 is an enlarged fragmentary cross-sectional view taken along line 4—4 of FIG. 3;

FIG. 5 is a front elevational view of a plurality of object sections which are to be joined to the object-forming guide members in FIG. 4;

FIG. 6 is a perspective view of an object-forming guide member positioned above an object section just prior to being joined thereto;

FIG. 7 is a perspective view of the joined components in FIG. 6, with an object cut therefrom;

FIG. 8 is a fragmentary perspective view of several objects positioned on the guide sheet;

FIG. 9 is a perspective view of the assembly in FIG. 8 with the background unit positioned thereon after placement of all of the objects on the guide sheet;

FIG. 10 is an illustration of the assembled pictorial composition;

FIG. 11 is a perspective view of an inner tube which is part of a hanging rod assembly which may be used to hang the pictorial composition of FIG. 10 on a wall;

FIG. 12 is a cross-sectional view taken along lines 12—12 of FIG. 11;

FIG. 13 is a perspective view of an outer tube which is employed in the hanging rod assembly; and FIG. 14 is a front elevational illustration of the hanging rod assembly including the components of FIGS. 11 and 13.

Referring to the drawings in detail, the ornamental system of the invention will best be understood by particular reference to FIGS. 1 through 10. The four components of the system are illustrated in FIGS. 1, 2, 3 and 5. For example, FIG. 1 illustrates a background unit 10 upon which the objects which form a part of the final pictorial composition are placed. As before mentioned, the background unit 10 is preferably composed of felt, but may be any other suitable material such as canvas, wood panelling or even paper. This unit is preferably provided with bright coloration to enhance the overall visual effect of the pictorial design.

FIG. 2 illustrates a guide sheet 11 which has a plurality of object outlines printed thereon, the outlines being positioned to form a mirror image of a pictorial composition. Each sepaarte object outline is given a number as illustrated. For example, the treetop is depicted by the numeral 12, the tree trunk 14, the ground 16, the clouds 18 and 20, the mountain peak 22, the mountain base 24, the chimney smoke 26, the house 28 and the hillside 30. Each number represents an outline shape of a different object in the final composition. As before explained, the guide sheet is used merely to receive correspondingly shaped objects in a proper position to form a mirror image arrangement of the objects which are later transferred to the background unit 10.

FIG. 3 illustrates a plurality of object-forming guide members 32, 34, 36, 38 and 40. As shown, each object-forming guide member is provided with a mirror image outline of at least one of the various objects which are to be included in the final pictorial composition. The object outlines are identical to those shown in FIG. 2 on the guide sheet, and are therefore similarly numbered. As illustrated each of the object-forming guide members 32 through 40 is provided with a printed notation regarding color. This notation is intended to properly match the object forming guide members with comparably colored object sections appearing in FIG. 5, as will later be more fully discussed. The guide members 32–40 are actually composed of a supporting vehicle material 42 with an adhesive coating 44, 46 on opposite surfaces thereof as best illustrated in the cross sectional view of FIG. 4. As there shown the adhesive coatings 44 and 46 are preferably covered with release papers 48 and 50. Although FIG. 4 is a cross sectional view of object-forming guide member 40, it is understood that each of the object-forming guide members 32 through 42 is similarly arranged. The release paper 50 is provided with the outlined shapes which are most clearly illustrated in FIG. 3. As also shown in FIG. 3 a section 52 of each release paper is cut to facilitate the removal of the release paper when desired.

FIG. 5 illustrates a plurality of object sections 54, 56, 58, 60 and 62. It will be noted that each object section is rectangularly shaped having essentially the same dimensions as the object-forming guide members 32 through 40 in FIG. 3. The shape and dimensions of the object sections need not conform to that of the object-forming guide members, but it may be quite useful to the individual who assembles the final product since the proper matching of object sections with guide members is ensured, and this may be quite advantageous if the color notation is not printed on the release paper 50. During the assembly operation each of the object sections 54 through 62 is placed in contact with the adhesive surface 44 on the object forming guide members 32–40 after release papers 48 are removed. The properly shaped objects are then cut out of the joined guide members and object sections by cutting along the outlined areas on each release paper 50.

FIGS. 6 and 7 clearly illustrate these procedural steps as they are applied to the formation of an object 12. In these illustrations and in FIGS. 8 and 9 the component parts are shown with exaggerated thickness for emphasis. FIG. 6 shows object section 58 in position to be attached to the adhesive surface 44 of the object-forming guide member 36 after the release paper 48 (not shown) had been removed from the adhesive surface 44. In this step, either the object-forming guide member 36 is superimposed on the object section 58 as illustrated in FIG. 6 and the joinder effected, or conversely the object section 58 may be superimposed on the guide member 36 and the joinder effected. FIG. 7 shows the object section 58 and the guide member 36 joined together at the adhesive surface 44. FIG. 7 also illustrates the object 12 i.e. the treetop in FIG. 2, after it is cut from the combined object section and guide member. The same procedure is employed for each of the other objects which will ultimately be a part of the final composition. When all of the objects are cut from the object section and guide member combinations, they are placed on the guide sheet of FIG. 2 in a position corresponding to the proper outline shape. This position can be found very simply by printing appropriate numbers or other indicia on the outline shapes of FIG. 2, and corresponding numbers or indicia on the release paper having the proper object outline imprinted thereon. However, as before explained the numbers or other indicia may be eliminated and proper matching of the objects to the guide sheet outlines can be performed by relating the outlined shapes.

FIG. 8 illustrates in a partial perspective view several objects properly positioned on the guide sheet 11. The objects 12 and 18 are placed with the object sections 58 and 54 in contact with the surface of guide sheet 11. The adhesive surfaces 46 of the objects 12 and 18 are exposed at the upper portion of the assembly. The release paper 50 is removed (it may be removed before or after placement on the guide sheet) thereby exposing the adhesive surfaces 46. After placement of all of the objects on the guide sheet, the background unit 10 is then carefully positioned on top of the objects as shown in FIG. 9. It may be rolled across the objects or placed in one movement atop all of the objects. When the adhesive surfaces 46 are contacted by the background unit 10 they cling to the unit and become an integral part thereof. Since the objects are placed on the guide sheet in a reverse or a mirror image position, they are transferred to the background unit in a position corresponding to a properly oriented pictorial composition. FIG. 10 shows this orientation, which upon examination is seen to be the reverse of that shown in FIG. 2. As illustrated in FIG. 10, all of the objects 12 through 30 are arranged so as to create a coordinated attractive pictorial design. Although not shown in FIG. 10, the objects are raised off the surface of the background unit 10 and therefore impart a three-dimensional image to the viewer. Since the objects 12–30 are actually a combination of the supporting vehicle material 42 adhesive coatings 44 and 46 and object sections 54 to 62, a sturdy and somewhat rigid character is effected in each object. As a result, the objects in the final composition do not easily wrinkle or buckle. Despite the rigidity of these objects they are flexible enough during the assembly procedure to be cut into the proper shapes very simply by an individual using a simple cutting tool such as a pair of scissors. The double effect of rigidity and flexibility can be achieved by employing a suitable material for the object sections. One such material which has performed quite well is felt, and it is the preferred material of the invention.

FIG. 10 also illustrates means for hanging the pictorial composition on a wall. The means includes hanging rod 64 which is provided with end caps 66, 68, and a hanging cord 70. The rod is affixed to the background unit in any conventional manner, either prior to or after assembly. Another rod 72 is affixed to the background unit at the bottom portion thereof for the purposes of maintaining the composition in an elongated position. This rod 72 is also provided with end caps 74 and 76. While the means shown in FIG. 10 may be any of the somewhat standard means normally employed for this type of assembly, FIGS. 11 through 14 illustrate the preferred hanging rod components and assembly of the invention.

Referring to FIG. 11 there is illustrated a resilient tube 78 which actually is an inner tube in the final assembly shown in FIG. 14. This tube is shown in cross section in FIG. 12, and is illustrated as having two substantially parallel flanged parts 80 and 82, extending along the length thereof, the flanged parts being placed on member 84. A similar arrangement on the same tube is shown at the opposite face thereof, where flanged parts 86 and 88 extend along the member 90. Flanged part 80 is opposite the part 86 and part 82 is directly opposite part 88. A second or outer resilient tube 92 shown in FIG. 13 includes a rope or string 94 passing into the hollow-portion of the tube and locked in place by means of the end cap 66. This tube is provided with a small slit or gap opening 96 which extends along the entire length of the tube. This cut is for the purpose of providing access for admission of the inner tube 78 and also to accept the background unit portion which will fit within the two tubes. The position of the inner tube in the overall assembly is shown best in FIG. 14. As there illustrated, the background unit 10 is positioned within the slit 96 of the tube 92 and is contacted and held between flanged parts 80 and 86, 82 and 88 which parts are brought to substantially contiguous positions by the force imparteed upon inner tube 78 by the constricted diameter of the outer tube 92 as the one tube is slid into the other during assembly. With this assembly the background unit is held in place at any portion thereof and an excess amount of background need not be wasted by rolling around a rod. In addition, the rod assembly is readily taken apart if desired, so that it may be used on other pictorial compositions with equal facility.

It will be appreciated that the above described ornamental system offers a means of assembling an unlimited variety of attractive pictorial designs or compositions which may be of any size. The assembly may be performed with unusual ease, material economy, and if desired, in an even shorter period of time than has heretofore been possible. The completed assemblies are professional in appearance and require no time consuming methods or difficult to work with implements such as glue. In addition, the system is equally attractive to both adults and children, since it provides an attractive completed product and affords the children the opportunity of coordinating their manipulative skills. The various procedural steps involved enable the children to employ reasoning as well as coordination, and furthermore, permits the exposure to various colors and object shapes so as to be of great value in their training.

Although a preferred material for the object sections comprises felt, cloth, textile or the like, a variety of other materials not in woven or fabric form may be used instead. Such materials may be in particulate form such as ground plastic, crushed glass, powdered flocking, and the like. These materials may be laid out as object sections in the manner illustrated in FIG. 5, and the object forming guide members and the object sections may then be joined together as shown in FIG. 6, or conversely the particulate elements of the object sections may be laid over or superimposed upon the guide members, and the joinder of the two then effected.

It is believed that the construction and method of use of my improved ornamental system, as well as the advantages thereof, will be apparent from the foregoing detailed description. It will also be apparent that while I have shown and described the improvement in a preferred form, changes may be made without departing from the scope of the invention.

I claim:

1. An ornamental system comprising a plurality of object sections, a plurality of object forming guide members adapted to receive said object sections to form integral objects therewith, a guide sheet having a plurality of object outlines on a surface thereof, said object outlines being positioned on said surface so as to define a pictorial composition and being shaped so as to correspond to the shapes of the integral objects formed when said object sections and said guide members are joined, said guide sheet being adapted to guide said objects in accordance with said object outlines to relative positions forming said pictorial composition and a background unit adapted to permanently receive said integral objects in said relative positions defined by said guide sheet surface when brought into contact with said integral objects to thereby form said pictorial composition on said background unit.

2. The ornamental system of claim 1, in which each object forming guide member is provided with an adhesive coating on opposite surfaces thereof, at least one of said surfaces having a releasable paper connected thereto, said paper having an object outlined thereon corresponding to an integral object to be placed in said pictorial composition, the other of said surfaces having an object section connected thereto, said integral object being shaped by cutting along said outline on said paper.

3. The ornamental system of claim 2, in which the other of said surfaces on said object forming guide member is connected to a releasable paper prior to being connected to an object section for the protection of said adhesive.

4. The ornamental system of claim 2, in which said object sections are each provided with a suitable color corresponding to their respective position in said pictorial composition, and said object forming guide members are each provided with indicia to indicate the proper color of the object section to be joined therewith.

5. The ornamental system of claim 1, in which said background unit and said object sections are composed of felt.

6. The ornamental system of claim 2, in which said releasable paper is provided with a cut along the central portion to facilitate the removal thereof prior to joining said shaped object and said background unit.

7. The ornamental system of claim 1, in which the object outlines on said guide sheet are positioned so as to define a mirror image of a pictorial composition whereupon when said integral objects placed thereon are transferred to said background unit a pictorial composition having the proper orientation is formed.

8. The ornamental system of claim 2, in which said background unit and said object sections are composed of felt.

9. The ornamental system of claim 1, in which said object sections are each provided with a suitable color corresponding to their respective position in said pictorial composition, and said object forming guide members are each provided with indicia to indicate the proper color of the object section to be joined therewith.

10. The ornamental system of claim 2, in which the object outlines on said guide sheet are positioned so as to define a mirror image of a pictorial composition whereupon when said integral objects placed thereon are transferred to said background unit a pictorial composition having the proper orientation is formed.

11. The ornamental system of claim 3, in which said releasable paper is cut along the central portion to facilitate the removal thereof prior to joining said formed object and said background unit.

12. The ornamental system of claim 7, in which the background unit is composed of felt.

13. The ornamental system of claim 1, in which the background unit is composed of felt, and the object sections are composed of particulate material.

14. A method of forming a pictorial composition comprising a plurality of shaped objects cooperatively arranged and operatively attached to a background unit, using the ornamental system of claim 17, comprising:
 (a) joining the surface of said guide members opposite said adhesively coated surface to said object sections thereby to form a plurality of articles;
 (b) forming properly shaped objects from said articles of step (a), said objects being shaped in accordance with the object outline on each release member;
 (c) removing said release member from said shaped objects thereby to expose said adhesively coated surface;
 (d) guiding said shaped objects with said guide sheet to proper relative positions forming said pictorial compositions; and
 (e) placing said adhesively coated surface of said shaped objects in contact with said background unit while maintaining said shaped objects in said relative positions, thereby to form said pictorial composition.

15. The method of claim 14, in which the steps (d) and (e) comprise:
 (d) placing said formed objects on said guide sheet with said adhesively coated surface positioned opposite said guide sheet surface, each formed object being positioned on said guide sheet in a location corresponding to its outline on said sheet; and
 (e) placing said background unit in contact with said exposed adhesively coated surfaces on said formed objects, thereby to attach said formed objects to said background unit in a proper location.

16. The method of claim 15, in which step (e) comprises rolling said background unit over said adhesively coated surfaces of said formed objects, thereby to sequentially engage said objects.

17. The ornamental system of claim 1 in which each object forming guide member is provided with an adhesive coating on at least one surface thereof, said one surface having a releasable paper connected thereto, said paper having an object outline thereon corresponding to an object to be placed in said pictorial composition, the other of said surfaces having an object section connected thereto to form integral objects therewith, said integral object being shaped by cutting along said outline on said paper.

References Cited

UNITED STATES PATENTS

| 1,232,228 | 7/1917 | Cornwell | 156—63X |
| 1,854,512 | 4/1932 | Heppes | 161—38 |
| 2,876,575 | 3/1959 | Leika | 156—248 |
| 3,130,113 | 4/1964 | Silman | 161—97 |
| 1,153,424 | 9/1915 | Doolittle et al. | 156—63 |
| 3,021,250 | 2/1962 | La Voie | 156—247X |

JOHN T. GOOLKASIAN, Primary Examiner

H. F. EPSTEIN, Assistant Examiner

U.S. Cl. X.R.

35—26; 156—182, 230, 239, 241, 299; 161—7, 37, 40, 406